(12) United States Patent
Takata

(10) Patent No.: US 8,305,365 B2
(45) Date of Patent: Nov. 6, 2012

(54) MOBILE DEVICE AND AREA-SPECIFIC PROCESSING EXECUTING METHOD

(75) Inventor: Hiroaki Takata, Ishikawa (JP)

(73) Assignee: PFU Limited, Ishikawa (JP)

( * ) Notice: Subject to any disclaimer, the term of this patent is extended or adjusted under 35 U.S.C. 154(b) by 763 days.

(21) Appl. No.: 12/427,928

(22) Filed: Apr. 22, 2009

(65) Prior Publication Data

US 2009/0289924 A1    Nov. 26, 2009

(30) Foreign Application Priority Data

May 23, 2008    (JP) ................. 2008-135923

(51) Int. Cl.
  *G09G 5/00*    (2006.01)
  *G06F 3/048*   (2006.01)
(52) U.S. Cl. ..................... 345/184; 715/765
(58) Field of Classification Search .......... None
  See application file for complete search history.

(56) References Cited

U.S. PATENT DOCUMENTS

| | | | |
|---|---|---|---|
| 7,230,605 B2 | 6/2007 | Rekimoto et al. | |
| 7,586,502 B2 * | 9/2009 | Festejo et al. ................. | 345/634 |
| 8,068,121 B2 * | 11/2011 | Williamson et al. .......... | 345/659 |
| 2008/0228754 A1 * | 9/2008 | Frank et al. ....................... | 707/5 |
| 2010/0066763 A1 * | 3/2010 | MacDougall et al. ........ | 345/656 |

FOREIGN PATENT DOCUMENTS

| | | |
|---|---|---|
| JP | 08-171414 A | 7/1996 |
| JP | 2000181619 | 6/2000 |
| JP | 2002207567 | 7/2002 |
| JP | 2002-297284 A | 10/2002 |
| JP | 2004164375 | 6/2004 |
| JP | 2004-310616 A | 11/2004 |
| JP | 2005038038 | 2/2005 |
| JP | 2006-048584 A | 2/2006 |
| JP | 2007069011 | 3/2007 |
| JP | 2008085618 | 4/2008 |

OTHER PUBLICATIONS

Japanese Office Action for Application No. 2008-135923 mailed May 8, 2012.
Japanese Office Action for Application No. 2008-135923 mailed Jul. 17, 2012.

* cited by examiner

*Primary Examiner* — K. Wong
(74) *Attorney, Agent, or Firm* — Lowe, Hauptman, Ham & Berner LLP

(57) ABSTRACT

A mobile device includes a control unit, a storage unit, a display unit, and a displacement detecting unit that detects displacement of a physical value caused when the mobile device moves, wherein the control unit includes an icon displaying unit that displays the icon in the display area, an icon moving unit that moves the icon displayed, in the display area and based on the displacement of the physical value, an area determining unit that compares coordinates of the icon moved and displayed in the display area to the specific area to thereby determine whether the icon is in the specific area, and an area-specific processing executing unit that retrieves the area-specific processing corresponding to the specific area and executes the area-specific processing when the area determining unit determines that the icon is in the specific area.

20 Claims, 11 Drawing Sheets

MOBILE DEVICE AND AREA-SPECIFIC PROCESSING EXECUTING METHOD

RELATED APPLICATIONS

The present application is based on, and claims priority from, Japan Application Number 2008-135923, filed May 23, 2008, the disclosure of which is hereby incorporated by reference herein in its entirety.

BACKGROUND OF THE INVENTION

1. Field of the Invention

The present invention relates to a mobile device and an area-specific processing executing method.

2. Description of the Related Art

Conventionally, in an inspection of a car, an equipment device, or the like, an inspector brings drawings, inspection sheets, and the like to be used for the inspection into an inspection site to conduct the inspection. In recent years, an inspector uses a mobile device in which data of the drawings and the like is input to conduct the inspection without bringing the actual drawings and the like into the inspection site.

For example, JP-A-8-171414 discloses an equipment inspecting device including a main body storing drawing information and a mobile device having a keyboard. An inspector uses the drawing information sent from the main body to the mobile device to conduct an equipment inspection and inputs inspection results by using the keyboard of the mobile device.

JP-A-2004-310616 discloses an inspection system including a server storing inspection information and a mobile device having an operating unit such as a touch panel. An inspector uses the inspection information sent from the server to the mobile device to conduct an equipment inspection and operates the touch panel or the like to manage inspection results.

JP-A-2006-48584 discloses an equipment inspection support system including a host computer storing information related to equipment inspections and a plurality of mobile devices having touch panels. A plurality of inspectors refer to the information related to the equipment inspections sent from the host computer to the mobile devices to conduct the equipment inspections at different sites.

A mobile device that performs processing such as change of screen display in synchronization with displacement detected by an acceleration sensor is developed.

For example, in a mobile device described in JP-A-2002-297284, a displayed screen of the mobile device is scrolled or zoomed according to a direction of acceleration detected by an acceleration sensor mounted on the mobile device and at different velocities according to magnitude of the acceleration.

With the mobile devices described in JP-A-8-171414, JP-A-2004-310616, JP-A-2006-48584 and the like used in the conventional inspection systems, however, a user needs to operate an input unit such as the keyboard and the touch panel of the mobile device to input the inspection result. When one of hands of the user not holding the mobile device is busy, the user has to operate the mobile device with only the other hand, which makes input operation difficult.

With the mobile device described in JP-A-2002-297284 and the like and mounted with the conventional acceleration sensor, a user is able to perform operation such as input operation with one hand by operation such as shaking of the mobile device because of the acceleration sensor. However, amounts of displacement detected by the acceleration sensor are not visualized and therefore it is difficult for the user to grasp small movements of the mobile device, which causes errors in the input and the like.

SUMMARY OF THE INVENTION

It is an object of the present invention to at least partially solve the problems in the conventional technology.

A mobile device according to one aspect of the present invention includes a control unit, a storage unit, a display unit, and a displacement detecting unit that detects displacement of a physical value caused when the mobile device moves, wherein the storage unit includes an area storage unit that stores a specific area in a display area displayed in the display unit and an area-specific processing to be executed when an icon is in the specific area while associating them with each other, and the control unit includes an icon displaying unit that displays the icon in the display area of the display unit, an icon moving unit that moves the icon displayed by the icon displaying unit, in the display area and based on the displacement of the physical value detected by the displacement detecting unit, an area determining unit that compares coordinates of the icon moved by the icon moving unit and displayed in the display area to the specific area stored in the area storage unit to thereby determine whether the icon is in the specific area, and an area-specific processing executing unit that retrieves the area-specific processing corresponding to the specific area and stored in the area storage unit and executes the area-specific processing when the area determining unit determines that the icon is in the specific area.

An area-specific processing executing method according to another aspect of the present invention is executed by a mobile device including a control unit, a storage unit, a display unit, and a displacement detecting unit that detects displacement of a physical value caused when the mobile device moves, wherein the storage unit includes an area storage unit that stores a specific area in a display area displayed in the display unit and an area-specific processing to be executed when an icon is in the specific area while associating them with each other, and the method includes an icon displaying step of displaying the icon in the display area of the display unit, an icon moving step of moving, in the display area based on the displacement of the physical value detected by the displacement detecting unit, the icon displayed at the icon displaying step, an area determining step of comparing coordinates of the icon moved at the icon moving step and displayed in the display area to the specific area stored in the area storage unit to thereby determine whether the icon is in the specific area, and an area-specific processing executing step of retrieving the area-specific processing corresponding to the specific area and stored in the area storage unit and executes the area-specific processing when the area determining step determines that the icon is in the specific area wherein, the steps are executed by the control unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a mobile device and an area-specific processing executing method and a program according to the present invention will be explained below in detail based on the drawings. The embodiment does not limit the invention.

In a specific example described in the following embodiment, the mobile device of the invention is used as a device for displaying drawings (inspection drawings, inspection check sheets, and the like) used in an inspection and inputting inspection results. However, the mobile device of the invention can be similarly applied to other embodiments.

Overview of the Invention

Figure 1:
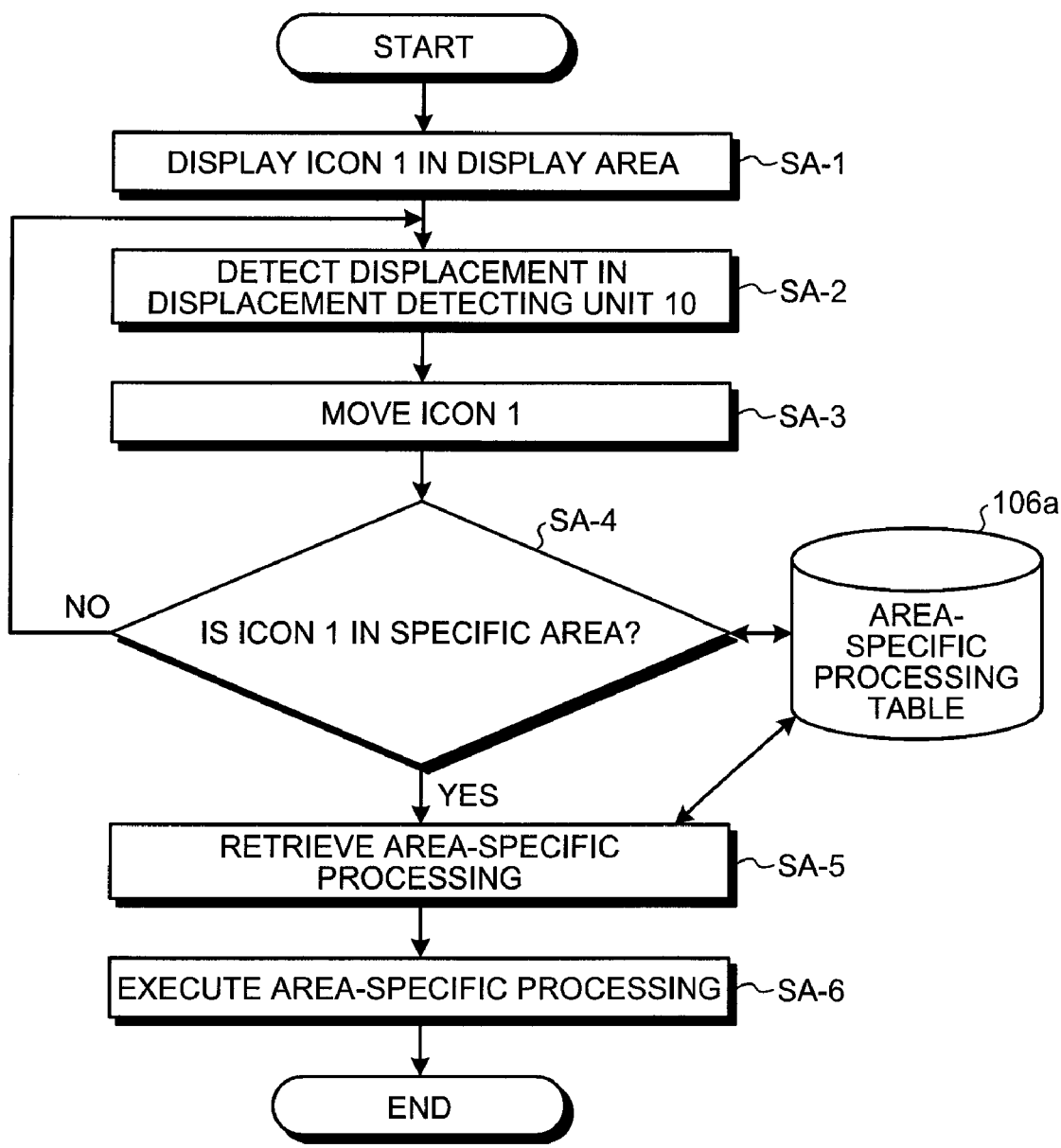
FIG. 1 is a flowchart showing a basic processing of the present invention.
Figure 2:
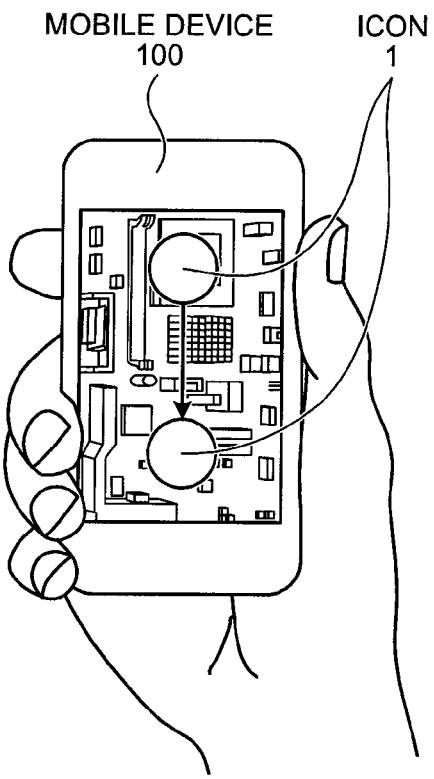
FIG. 2 is a view showing one example of an icon 1 displayed in a display area of the present invention.
Figure 3:
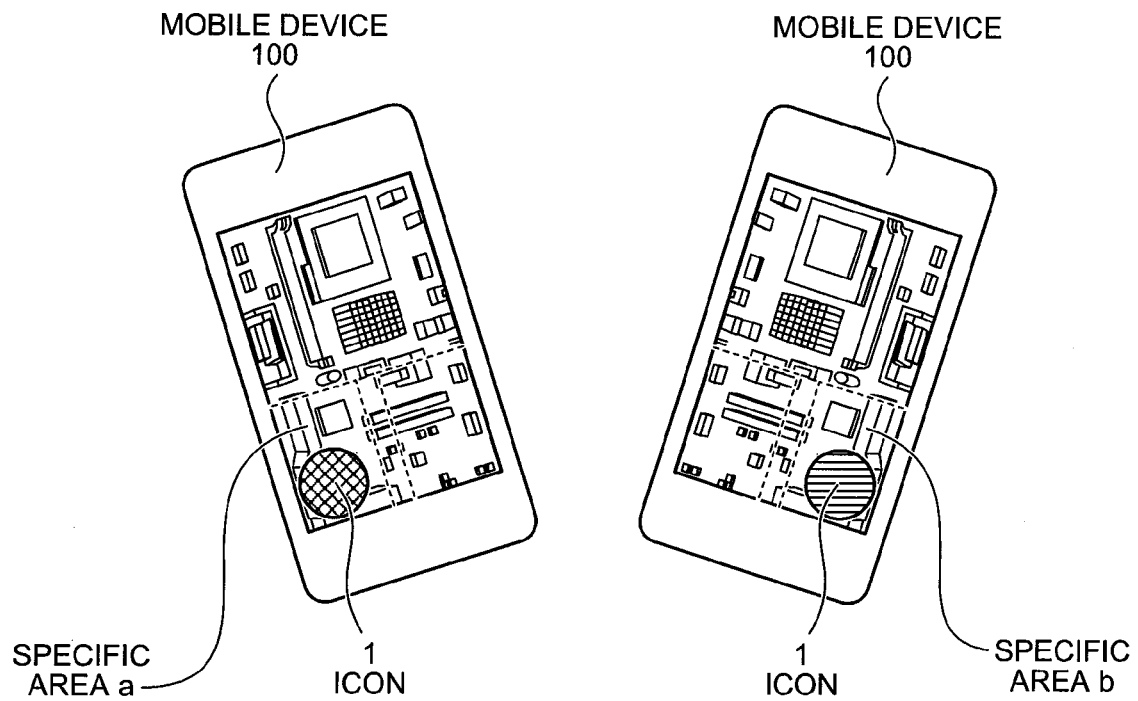
FIG. 3 is a view showing one example of a specific area displayed in the display area of the present invention.
Figure 4:
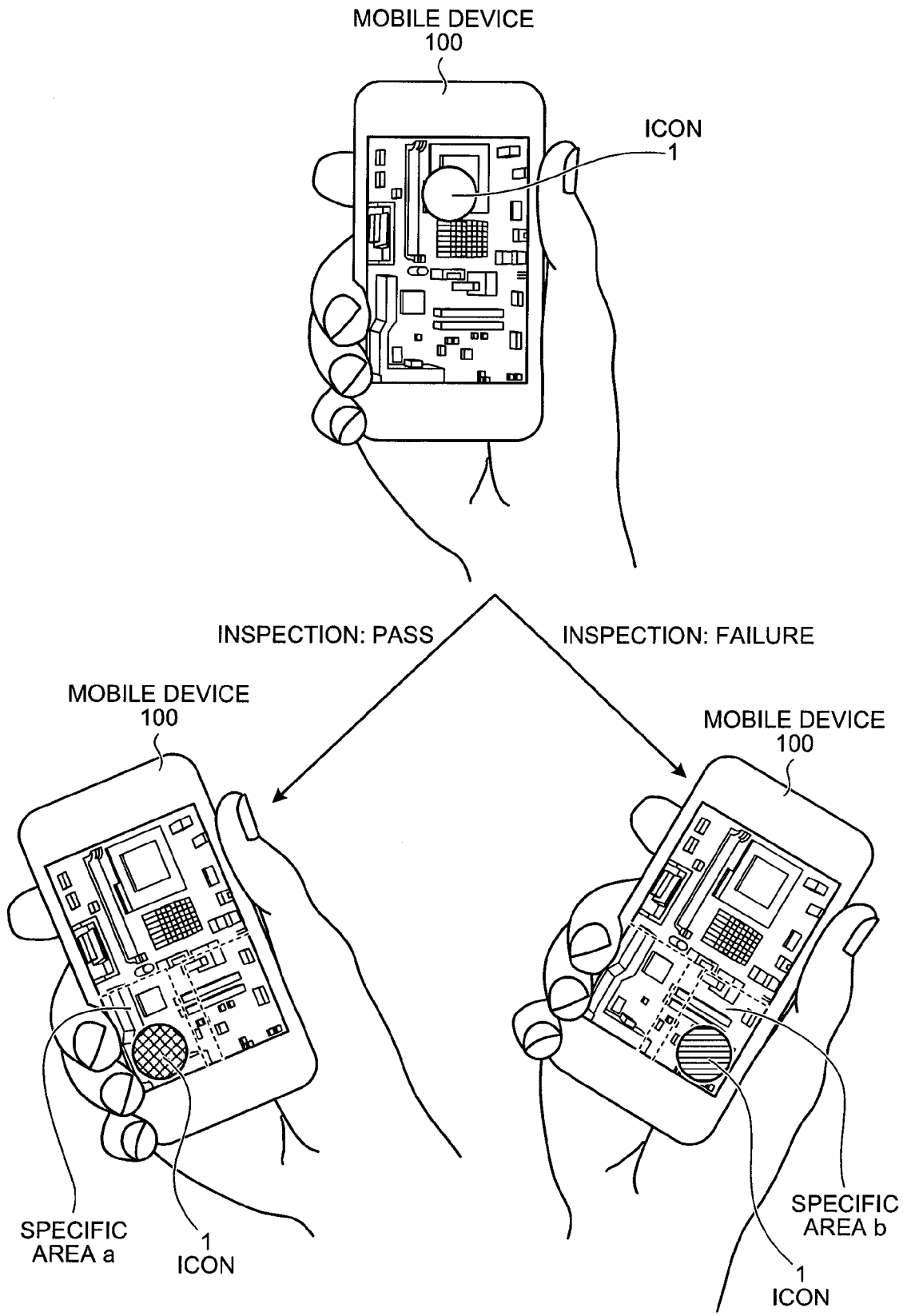
FIG. 4 is a view showing one example of an area-specific processing.
Figure 5:
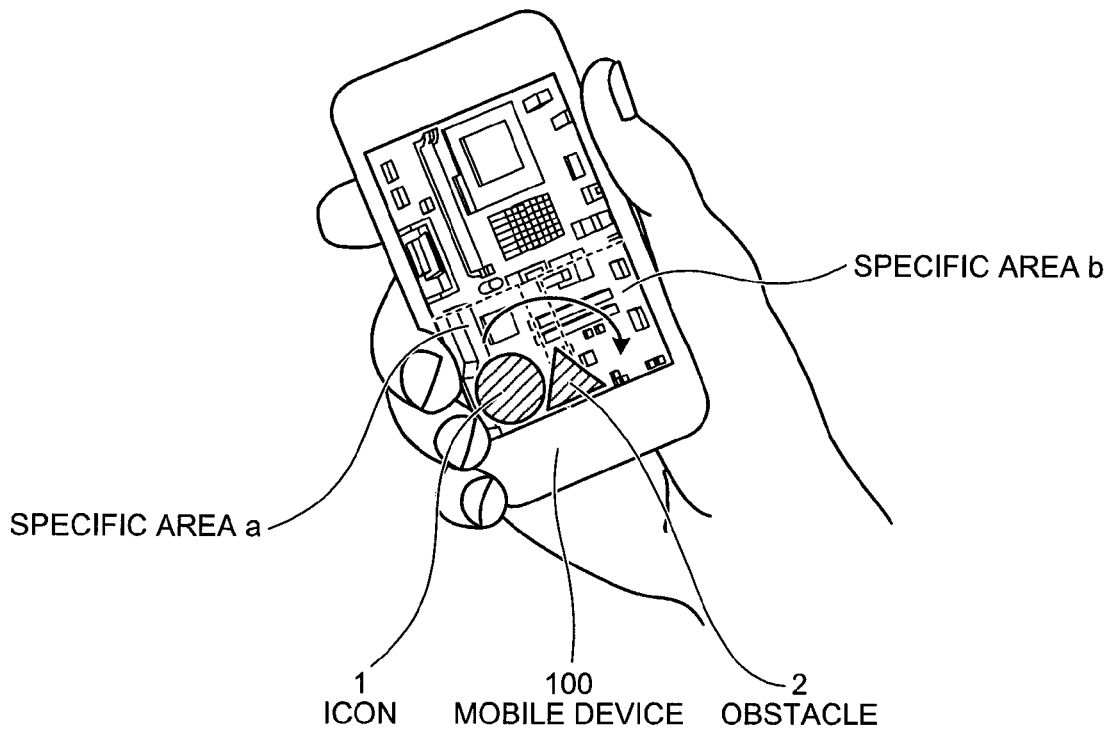
FIG. 5 is a view showing one example of an obstacle 2 displayed in the display area of the present invention.
Figure 6:
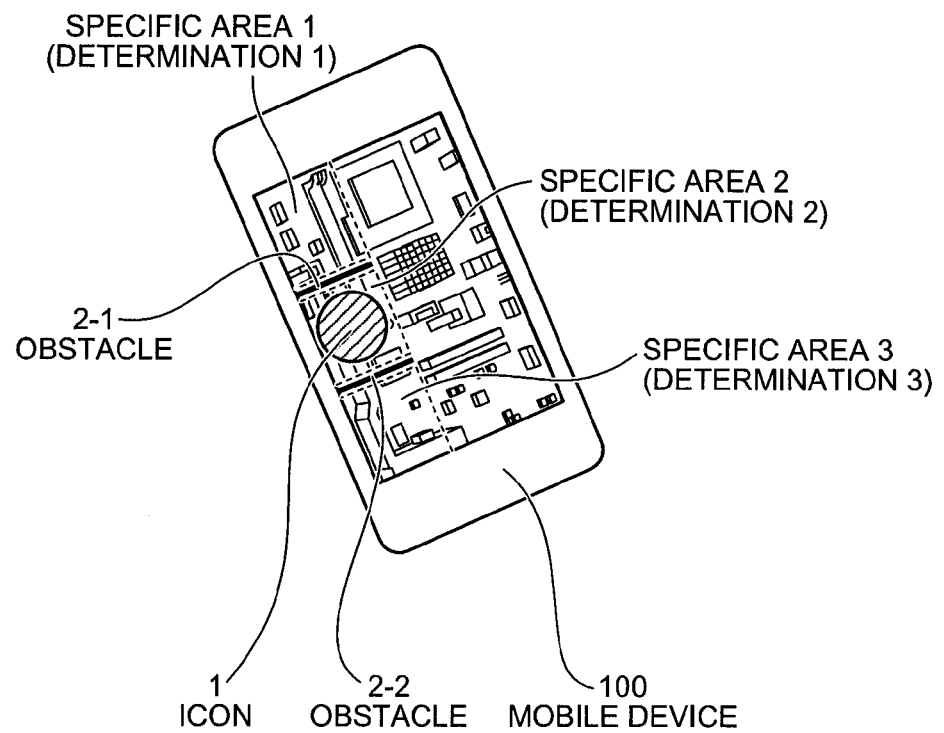
FIG. 6 is a view showing one example of the obstacle 2 displayed in the display area of the present invention.
Figure 7:
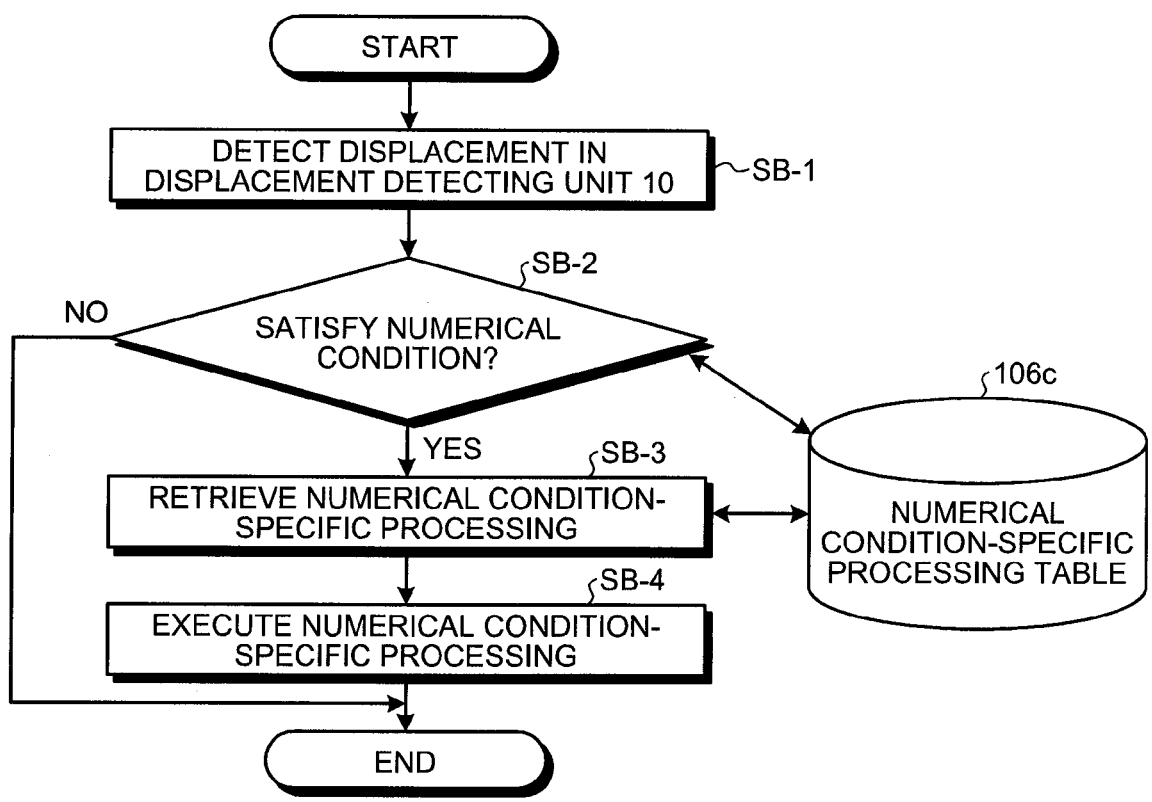
FIG. 7 is a flowchart showing a numerical condition-specific processing.
Figure 8:
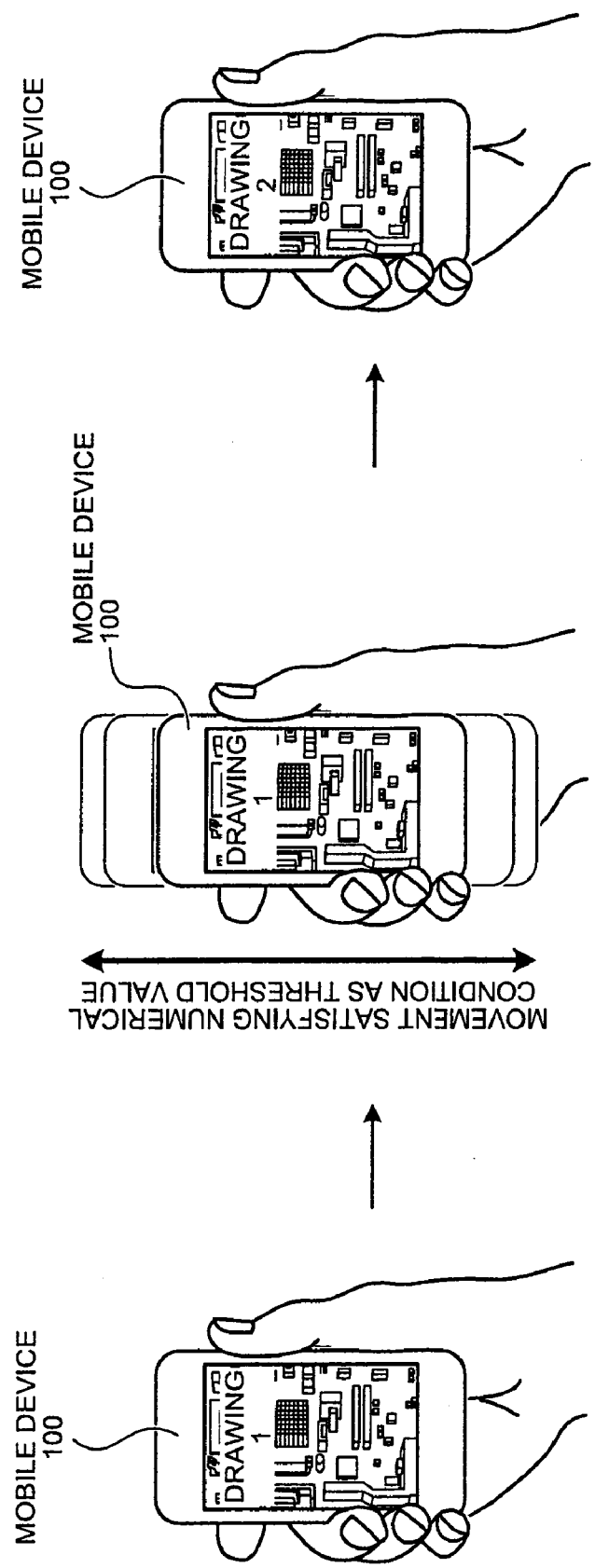
FIG. 8 is a view showing the numerical condition-specific processing.

The following outlines the present invention, and then, a configuration and processing of the present invention are explained in detail with reference to FIGS. 1 to 8. FIG. 1 is a flowchart showing a basic processing of the present invention. FIG. 2 is a view showing one example of an icon 1 displayed in a display area of the mobile device 100. FIG. 3 is a view showing one example of a specific area displayed in the display area of the mobile device 100. FIG. 4 is a view showing one example of an area-specific processing. FIGS. 5 and 6 are views showing one example of an obstacle 2 displayed in the display area of the mobile device 100. FIG. 7 is a flowchart showing one example of a numerical condition-specific processing. FIG. 8 is a view showing one example of the numerical condition-specific processing.

The invention has schematically following basic features. In other word, the mobile device 100 comprises a control unit, a storage unit, a display unit, and a displacement detecting unit that detects displacement of a physical value caused when the mobile device 100 moves.

As shown in FIG. 1, the control unit of the mobile device 100 displays the icon 1 in the display area of the display unit (step SA-1).

Referring to FIG. 2, one example of an icon 1 displayed in a display area of the display unit will be explained below. In FIG. 2, as an example, the control unit of the mobile device 100 displays a drawing (e.g., a drawing of a substrate of a computer or the like to be inspected) used for the inspection as a background image and superimposes the icon 1 on the background image in the display area of the mobile device 100, the icon 1 moving based on displacement of a physical value detected by the displacement detecting unit.

As shown in FIG. 2, the control unit of the mobile device 100 may display the background image (e.g., a drawing of a portion to be inspected, a check sheet, or the like) in the display area. The control unit of the mobile device 100 may superimpose the icon 1 on the background image. The control unit of the mobile device 100 may display the icon 1 in a circular or spherical shape. The control unit of the mobile device 100 may display the icon 1 in a translucent color.

Referring back to FIG. 1, a displacement detecting unit 10 of the mobile device 100 detects the displacement of the physical value caused when the mobile device 100 moves (step SA-2). Here, the displacement detecting unit 10 of the mobile device 100 may be formed of an acceleration sensor, a gyroscope, or a magnetic sensor, for example, or a combination of any of them.

The "physical value" refers to a value (e.g., time, mass, velocity, scalar, or vector) that is inherent in an object to be measured and can be measured objectively. Examples of the physical value are acceleration and gravity acceleration in measurement using the acceleration sensor, angular velocity in measurement using the gyroscope, and intensity and direction of magnetic field in measurement using the magnetic sensor.

The control unit of the mobile device 100 moves the icon 1 in the display area and based on the displacement of the physical value detected by the displacement detecting unit 10 (step SA-3). In other words, the control unit of the mobile device 100 calculates a direction, a distance, time, speed, and the like of movement based on the displacement in the physical value detected by the displacement detecting unit 10 and carries out image control to change coordinates of the icon 1 to be displayed in the display area of a display unit according to the calculated values. For example, when a user moves the mobile device 100 including the displacement detecting unit 10 formed of a triaxial acceleration sensor, the control unit of the mobile device 100 may calculate changes in a direction, a distance, time, speed, and the like of two-dimensional movement (on an X-Y plane, for example) in the display area of the display unit based on acceleration or gravity acceleration detected by the displacement detecting unit 10 and along each axis of three-dimensional axes expressed as X, Y, and Z axes and change coordinates of the icon 1 to be displayed in the display area according to the calculated values.

Referring again to FIG. 2, the movement of the icon 1 in the display area based on the displacement of the physical value detected by the displacement detecting unit of the mobile device 100 will be explained below.

As shown in FIG. 2, the control unit of the mobile device 100 may carry out image control to move the icon 1 displayed in an upper portion of the display area to a lower portion of the display area in synchronization with the displacement of the physical value (e.g., displacement of the acceleration caused by shaking operation of the mobile device 100 by the user from an upper position to a lower position) detected by the displacement detecting unit 10 of the mobile device 100.

Referring back to FIG. 1, an area-specific processing table 106a that stores a specific area in a display area displayed in the display unit and an area-specific processing to be executed when an icon 1 is in the specific area while associating them with each other is stored in advance in the storage unit of the mobile device 100. The control unit of the mobile device 100 compares coordinates of the icon 1 moved and displayed in the display area to the specific area stored in the area-specific processing table 106a to thereby determine whether the icon 1 is in the specific area (step SA-4).

The "specific area" refers to an area that occupies the whole or part of the display area displayed in the display unit and is associated with the area-specific processing. For the convenience of operation by the user, the specific area may be displayed in the display area.

The "area-specific processing" refers to processing executed by the control unit of the mobile device 100 when the icon 1 is in the specific area in the display area of the mobile device 100. For example, the area-specific processing may be input of determination results (e.g., pass or failure of the inspection) of the inspection conducted by the user.

Referring to FIG. 3, one example of the specific area displayed in the display area of the mobile device 100 will be explained below.

As shown in FIG. 3, for example, as the specific areas, a portion near a lower left corner (the lower left corner of the rectangular display area: a specific area a) of the display area of the display unit of the mobile device 100 and a portion near a lower right corner (the lower right corner of the rectangular display area: a specific area b) of the display area of the mobile device 100 are designated. In FIG. 3, the area-specific processing table 106a stores, for the specific area a, information (e.g., coordinates of the specific area a) specifying the specific area a and the area-specific processing to be executed when the icon 1 is in the specific area a while associating them with each other and stores, for the specific area b, information (e.g., coordinates of the specific area b) specifying the specific area b and the area-specific processing to be executed when the icon 1 is in the specific area b while associating them with each other.

As shown in FIG. 3, the control unit of the mobile device 100 may determine that the icon 1 is in the specific area when all or at least part of the coordinates of the displayed icon 1 are included in the specific area in the display area.

The control unit of the mobile device 100 may change a display format of the icon 1 (e.g., color or shape of the icon 1) when it determines that the icon 1 is in the specific area in the display area. For example, when the user moves the icon 1 into the specific area in the display area of the mobile device 100, the control unit of the mobile device 100 may carry out image control to change the color of the icon 1 (e.g., from a translucent color to an opaque color, from yellow to blue or red, from a stripe pattern to a lattice pattern, or from illumination to blinking). As another example, when the user moves the icon 1 into the specific area in the display area of the mobile device 100, the control unit of the mobile device 100 may carry out image control to change the shape of the icon 1 (e.g., from a circle to a rectangle or from a small shape to a large shape). In the example shown in FIG. 3, the display format is changed to the lattice pattern when the icon 1 is moved into the specific area a and to the stripe pattern when the icon 1 is moved into the specific area b.

Referring back to FIG. 1, when the control unit of the mobile device 100 determines that the icon 1 is in the specific area (Yes at step SA-4), the control unit retrieves the area-specific processing corresponding to the specific area and stored in the area-specific processing table 106a (step SA-5).

The control unit of the mobile device 100 executes a processing set by the area-specific processing retrieved (step SA-6).

Referring to FIG. 4, one example of an area-specific processing will be explained below.

As shown in FIG. 4, the control unit of the mobile device 100 may perform the area-specific processing, which is input of "pass of the inspection of the inspected object", when the icon 1 is in the specific area a near the lower left corner of the display area while perform the area-specific processing, which is input of "failure of the inspection of the inspected object", when the icon 1 is in the specific area b near the lower right corner of the display area. In other words, the user moves the mobile device 100 to move the icon 1 to thereby input the inspection result (pass or failure) of the desired inspected object to the mobile device 100.

Referring back to FIG. 1 again, when the control unit of the mobile device 100 determines that the icon 1 is not in the specific areas in the display area (NO at step SA-4), the control unit ends the processing and returns to step SA-2.

The control unit of the mobile device 100 may display an obstacle 2 in the display area and carry out image display control so that the icon 1 cannot move through the obstacle 2 in moving the icon 1 in the display area based on the displacement of the physical value detected by the displacement detecting unit 10.

Referring to FIGS. 5 and 6, one example of an obstacle 2 displayed in the display area of the mobile device 100 will be explained below.

Although the obstacle 2 in the display area of the mobile device 100 is expressed as a triangular shape in the example shown in FIG. 5, it may be in any shape that prevents movement of the icon 1 in the display area.

To put it concretely, in FIG. 5, for example, the obstacle 2 is displayed as the triangular shape in a middle position between the portion (specific area a) near the lower left corner and the portion (specific area b) near the lower right corner of the display area of the mobile device 100. To move the icon 1 from the portion (specific area a) near the lower left corner to the portion (specific area b) near the lower right corner, the user needs not only to operate the mobile device 100 to the left or right but also to move the icon 1 upward, from the left to the right, and then downward to get around the obstacle 2.

As shown in FIG. 6, obstacles 2-1 and 2-2 in the display area of the mobile device 100 may be displayed on boundaries between the specific areas 1 to 3 in the display area and associated with the pieces of area-specific processing, which is input of the determination results 1 to 3. As described above, according to the invention, any number of specific areas corresponding to the number of determination results may be displayed in the display area or any number of obstacles 2 may be disposed in any positions as partitions between the specific areas to prevent erroneous operation by the user.

To put it concretely, in FIG. 6, for example, the obstacles 2-1 and 2-2 are displayed as stick-like shapes on the boundaries between the specific areas 1 to 3 in the display area of the mobile device 100. To move the icon 1 into a different specific area, the user needs not only to operate the mobile device 100 upward or downward but also to move the icon 1 from the left to the right once, upward or downward, and then from the right to the left to get around the obstacles 2-1 and 2-2.

The storage unit of the mobile device 100 may store, as a numerical condition-specific processing table 106c, numerical conditions of the displacement of the physical value and pieces of numerical condition-specific processing, each of which is executed when the displacement detecting unit 10 detects the displacement in the physical value satisfying the numerical condition, while associating them with each other. The control unit of the mobile device 100 compares the displacement of the physical value detected by the displacement detecting unit 10 to the numerical condition stored in the storage unit to thereby determine whether the displacement of the physical value satisfies the numerical condition. If the control unit determines that the displacement satisfies the numerical condition, it may retrieve the numerical condition-specific processing corresponding to the numerical condition and stored in the storage unit and execute the numerical condition-specific processing.

The "numerical condition" refers to a reference numerical value, a reference range of numerical value, or the like. For example, to determine displacement of acceleration, the numerical condition may be 1) equal to or more/less than a threshold value (e.g., equal to or more than 5 m/s$^2$, equal to or less than 0.3 m/s$^2$), 2) in a certain range (e.g., in a range of 1 m/s$^2$ to 3 m/s$^2$), or 3) a specific value (e.g., 30 m/s$^2$).

One example of the numerical condition-specific processing performed by the control unit of the mobile device 100 will be explained below with reference to FIGS. 7 and 8.

FIG. 7 is a flowchart showing a numerical condition-specific processing performed by the mobile device 100.

First, as shown in FIG. 7, the displacement detecting unit 10 of the mobile device 100 detects the displacement of the physical value caused when the mobile device 100 moves (step SB-1).

Then, the control unit of the mobile device 100 compares the displacement of the physical value detected by the displacement detecting unit 10 to the numerical condition stored in the storage unit to thereby determine whether the displacement of the physical value satisfies the numerical condition (step SB-2).

If the control unit of the mobile device 100 determines that the displacement of the physical value detected by the displacement detecting unit 10 satisfies the numerical value (Yes at step SB-2), it retrieves the numerical condition-specific processing corresponding to the numerical condition and stored in the numerical condition-specific processing table 106c (step SB-3).

The control unit of the mobile device 100 executes the numerical condition-specific processing stored in the numerical condition-specific processing table 106c and ends the processing (step SB-4).

As shown in FIG. 8, when the user shakes the mobile device 100 over a certain or longer vertical distance at a certain or higher speed and the displacement detecting unit 10 detects the displacement of the physical value satisfying the numerical condition, the control unit may perform the numerical condition-specific processing such as change of the background image displayed in the display area of the mobile device 100 (e.g., change from "a drawing 1" to "a drawing 2"). As another example, when the user shakes the mobile device 100 over a certain or shorter horizontal distance at a certain or lower speed and the displacement detecting unit 10 detects the displacement of the physical value satisfying the numerical condition, the control unit may perform the numerical condition-specific processing such as recording of the inspection result. As still another example, when the user rotates the mobile device 100 in a horizontal direction at a certain or higher speed and the displacement detecting unit 10 detects the displacement of the physical value satisfying the numerical condition, the control unit may perform the numerical condition-specific processing such as a retry of recording of the inspection result.

Referring back to FIG. 7 again, when the control unit of the mobile device 100 determines that the displacement of the physical value detected by the displacement detecting unit 10 does not satisfy the numerical condition (No at step SB-2), the control unit ends the processing.

Configuration of the Mobile Device 100

Figure 9:
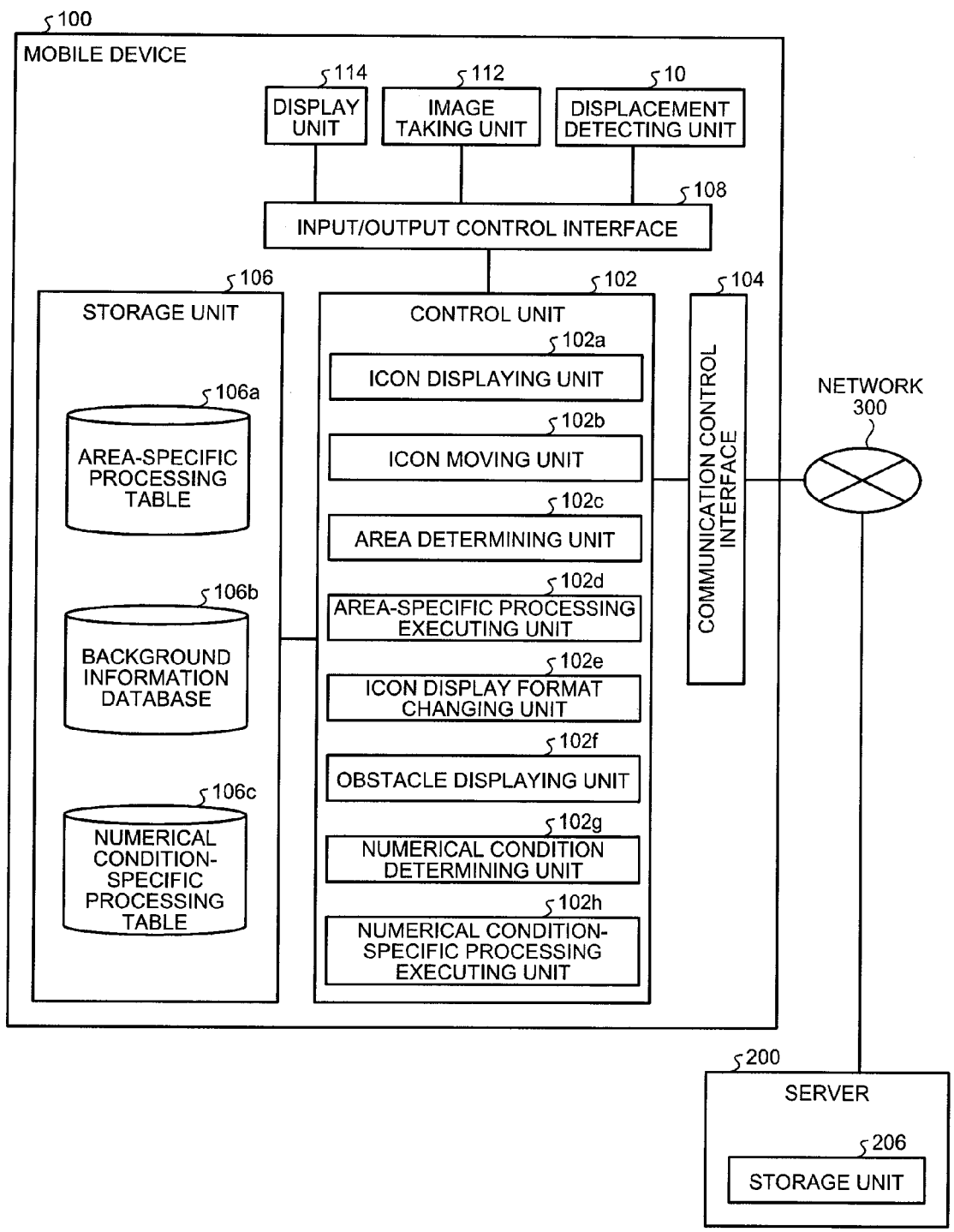
FIG. 9 is a block diagram showing one example of a configuration of a mobile device 100 according to the embodiment.

Referring to FIG. 9, configuration of a mobile device 100 will be explained. FIG. 9 is a block diagram showing one example of a configuration of the mobile device 100 according to the embodiment.

In FIG. 9, in general, the mobile device 100 is provided with a control unit 102 such as a CPU that integrally controls the entire mobile device 100, a communication control interface 104, an input/output control interface 108 connected to a display unit 114, an image taking unit 112, and the displacement detecting unit 10, and a storage unit 106 that stores various databases and tables, and the units are communicably connected through an optional communication channel. Further, the mobile device 100 may be communicatably connected to a network 300 via a communication device (not shown) realizing network communication (e.g., internet via a communication line), and connect be communicatably connected to a server 200 provided with a storage unit 206 via the network 300. A configuration of the server 200 will be described below.

In FIG. 9, the input/output control interface 108 controls the display unit 114, the image taking unit 112, and the displacement detecting unit 10 The display unit 114 is a display unit having a function of displaying the icon 1, the obstacle 2, the background image, and the like in the display area. For example, the display unit 114 may corresponds to a display made of liquid crystal, organic electro-luminescence, or the like. The displacement detecting unit 10 is a displacement detecting unit that detects the displacement of the physical value (e.g., acceleration, gravity acceleration, angular velocity, magnetic flux, direction, distance, angle, speed, time, or pressure) caused when the mobile device 100 moves. An example of the displacement detecting unit 10 is a sensor (e.g., a triaxial acceleration sensor, a gyroscope, or a magnetic sensor) having a function of changing the movement of the mobile device 100 into an electric signal. The image taking unit 112 is an image taking unit that takes an image of the portion to be inspected of the object to be inspected in the inspection or an image as proof of the inspection. For example, the image taking unit 112 is a video camera, a digital camera, or a web camera formed of a solid-state image sensor such as a charge coupled device (CCD) and a complementary metal oxide semiconductor (CMOS).

In FIG. 9, the various databases and tables (such as the area-specific processing table 106a, a background information database 106b, and the numerical condition-specific processing table 106c) stored in the storage unit 106 are storage units such as fixed disk devices, and store various programs, various tables, various databases, various file, the displacement of the physical value detected by the displacement detecting unit 10, and the like used in various processes.

Out of the respective components in the storage unit 106, the area-specific processing table 106a is an area storage unit that stores the specific area occupying the whole or part of the display area and the area-specific processing such as input and output executed when the icon 1 is in the specific area while associating them with each other. For example, the area-specific processing table 106a may store an area (e.g., lower left and right corners of the rectangular display area) in the display area set in advance by the user and input of the determination result (e.g., pass or failure of the inspection) of the inspection conducted by the user while associating them with each other.

The background information database 106b is an image storage unit that stores images (e.g., the drawing, the inspection sheet, and specifications) of the object to be inspected in the inspection, the images being obtained in advance by reading by an image reading unit (not shown) such as a scanner by the user. The background information database 106b may store the image such as the drawing of the object to be inspected or store a designated position on the object to be inspected and an image such as a drawing of a predetermined area of the object to be inspected while associating them with each other.

The numerical condition-specific processing table 106c is a numerical condition storage unit that stores the numerical condition and the numerical condition-specific processing such as input or output while associating them with each other. The numerical condition is the reference numerical value or the reference range of numerical value of the displacement of the physical value (e.g., the acceleration and the angular velocity) caused when the user moves the mobile device 100. The numerical condition-specific processing is different from the area-specific processing executed when the displacement detecting unit 10 detects the displacement of the physical value satisfying the numerical condition as a result of moving of the mobile device 100 by the user. For example, the numerical condition-specific processing table 106c may store a range condition of the acceleration (e.g., an acceleration in a range of 5 m/s$^2$ to 8 m/s$^2$) in vertical movement of the mobile device 100 by the user and the processing such as change of the background image to be displayed in the display area of the mobile device 100 (e.g., change from the drawing of the object to be inspected to the inspection sheet stored in the background information database 106b) while associating them with each other.

In FIG. 9, the control unit 102 includes an internal memory that stores a control program such as an operating system (OS), programs specifying various processing procedures, and necessary data and performs information processing for executing various pieces of processing by using these programs. The control unit 102 functionally and conceptually includes an icon displaying unit 102a, an icon moving unit 102b, an area determining unit 102c, an area-specific processing executing unit 102d, an icon display format changing unit 102e, an obstacle displaying unit 102f, a numerical condition determining unit 102g, and a numerical condition-specific processing executing unit 102h.

Out of these units, the icon displaying unit 102a is an icon displaying unit that displays the icon 1 in the display area of the display unit 114. The storage unit 106 may store, in advance, any image data such as a circle and a sphere that forms the icon 1. The icon displaying unit 102a may display the background image in the display area stored in advance in the storage unit 106 and display the icon 1 by superimposing it on the background image. The icon displaying unit 102a can also display the icon 1 in a translucent color.

The icon moving unit 102b is an icon moving unit that moves the icon 1, which is displayed by the icon displaying unit 102a, in the display area based on the displacement of the physical value detected by the displacement detecting unit 10.

The area determining unit 102c is an area determining unit that compares the coordinates of the icon 1 displayed in the display area and moved by the icon moving unit 102b to the specific area stored in the area-specific processing table 106a to thereby determine whether the icon 1 is in the specific area.

The area-specific processing executing unit 102d is an area-specific processing executing unit that retrieves the area-specific processing stored in the area-specific processing table 106a and corresponding to the specific area to execute the area-specific processing when the area determining unit 102c determines that the icon 1 is in the specific area.

The icon display format changing unit 102e is an icon display format changing unit that changes the display format of the icon 1 when the area determining unit 102c determines that the icon 1 is in the specific area. The display format of the icon 1 may include the color or the shape of the icon 1.

The obstacle displaying unit 102f is an obstacle displaying unit that displays the obstacle 2 in the display area of the display unit 114. The storage unit 106 may store, in advance, image data such as a triangle and a rectangle that forms the obstacle 2. The obstacle displaying unit 102f displays the image data of the obstacle 2 in a predetermined position (e.g., a partition position of the specific area).

The numerical condition determining unit 102g is a numerical condition determining unit that compares the displacement of the physical value detected by the displacement detecting unit 10 to the numerical condition stored in the numerical condition-specific processing table 106c to each other to thereby determine whether the displacement of the physical value satisfies the numerical condition.

The numerical condition-specific processing executing unit 102h is a numerical condition-specific processing executing unit that retrieves the numerical condition-specific processing stored in the numerical condition-specific processing table 106c and corresponding to the numerical condition to execute the numerical condition-specific processing when the numerical condition determining unit 102g determines that the displacement satisfies the numerical condition.

In FIG. 9, the communication control interface 104 controls communication between the mobile device 100 and the network 300. That is to say, the communication control interface 104 has a function to communicate data to an external device such as the server 200 through a communication line. The network 300 has function of connecting the mobile device 100 with the external device such as the server 200, and may include internet, intranet, LAN (wired/wireless), public telephone network (analog/digital), or the like.

Configuration of the Server 200

A configuration of the server 200 will be explained in detail with reference to FIG. 9.

The server 200 is communicatably connected to the network 300 such as the internet thorough a communication device such as a router, and a wired or wireless communication line such as a dedicated line, is communicatably connected to the mobile device via the network 300, and is provided with the storage unit 206. The server 200 can be configured as WEB server, ASP server, and the like, and the hardware can be configured by an information processing device and the accessory devices such as existing personal computer, and workstation. Each function of the server 200 can be realized by a central processing unit (CPU) in the server 200, a disk device, an input device, an output device, a communication control interface, and the like, and a computer program etc. controlling these devices.

Here the storage unit 206 of the server 200 may record the inspection result of the inspected portion input by the area-specific processing executed by the area-specific processing executing unit 102d of the mobile device 100 and the proof of the inspection of the inspected portion as the image taken by the image taking unit 112 when the user conducts the inspection in this embodiment. This is the end of the explanation of the structure of the server 200.

Area-Specific Processing Executing Processing

Figure 10:
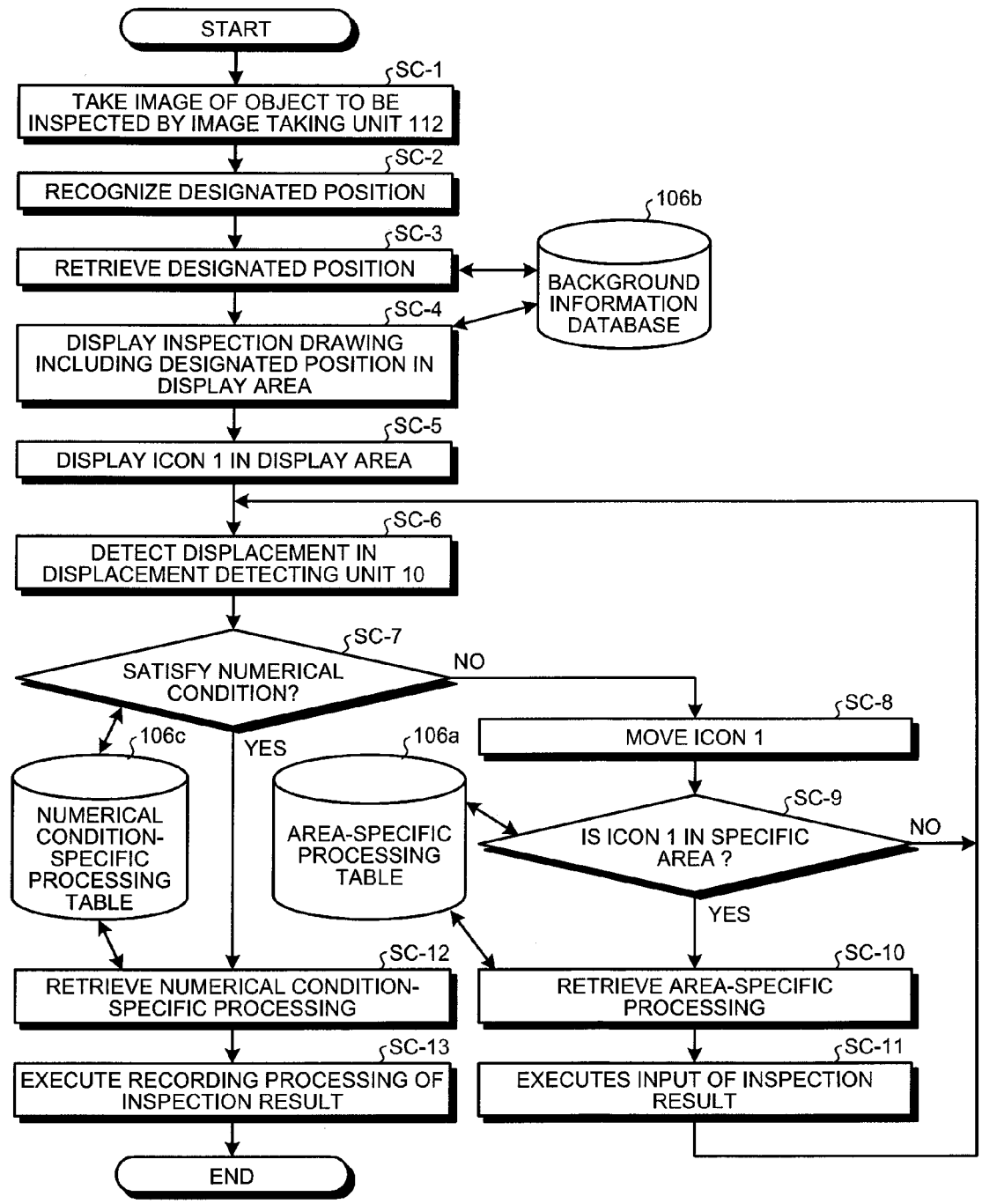
FIG. 10 is a flowchart showing one example of an area-specific processing executing processing according to the embodiment.
Figure 11:
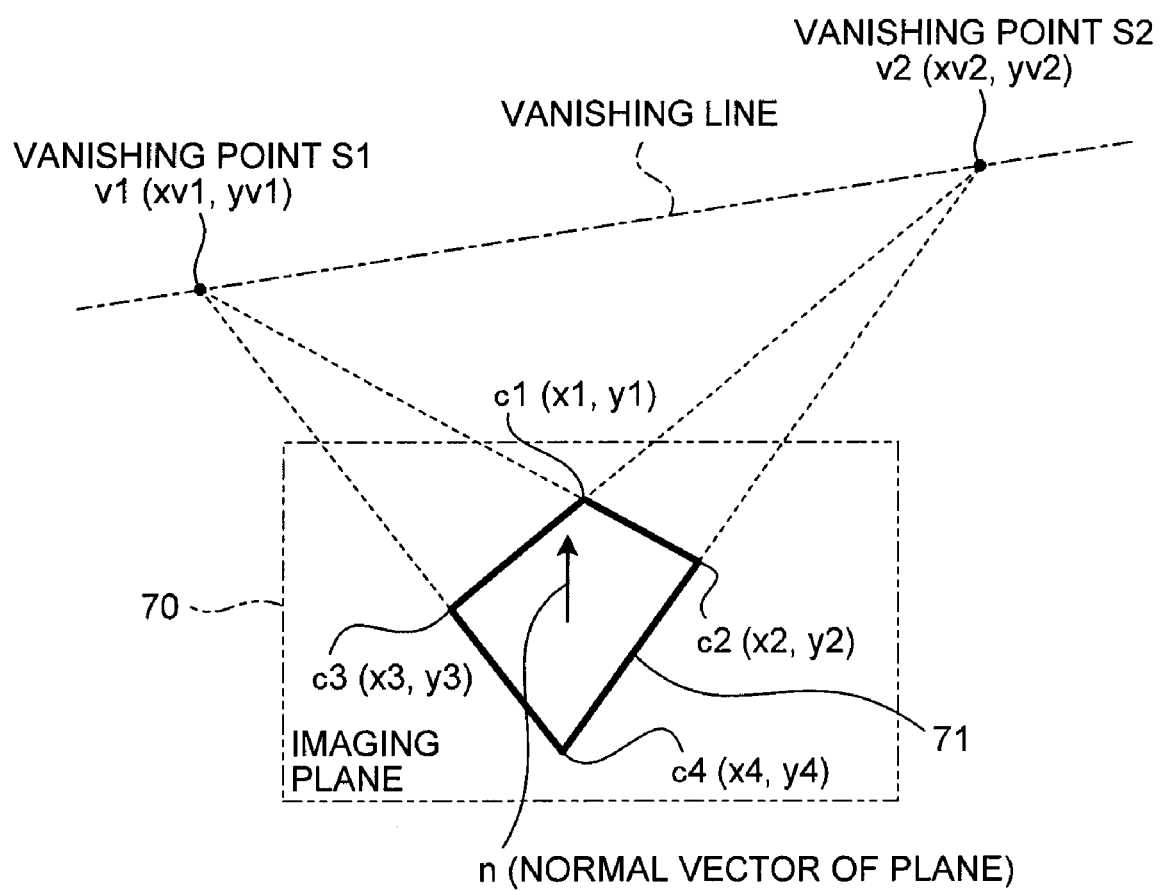
FIG. 11 is a view showing one example of a projective transformation according to the embodiment.
Figure 12:
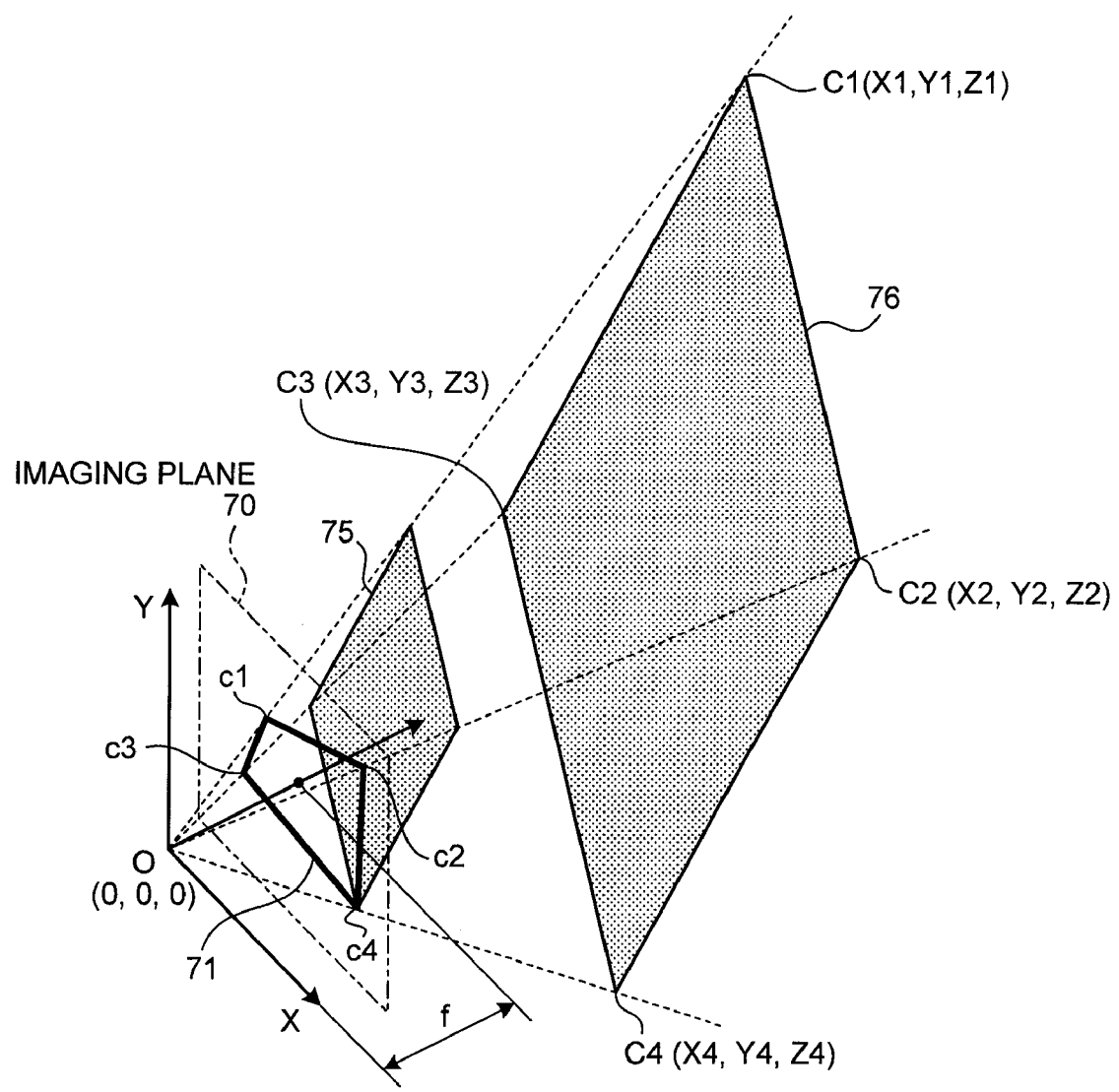
FIG. 12 is a view showing one example of the projective transformation according to the embodiment.
Figure 13:
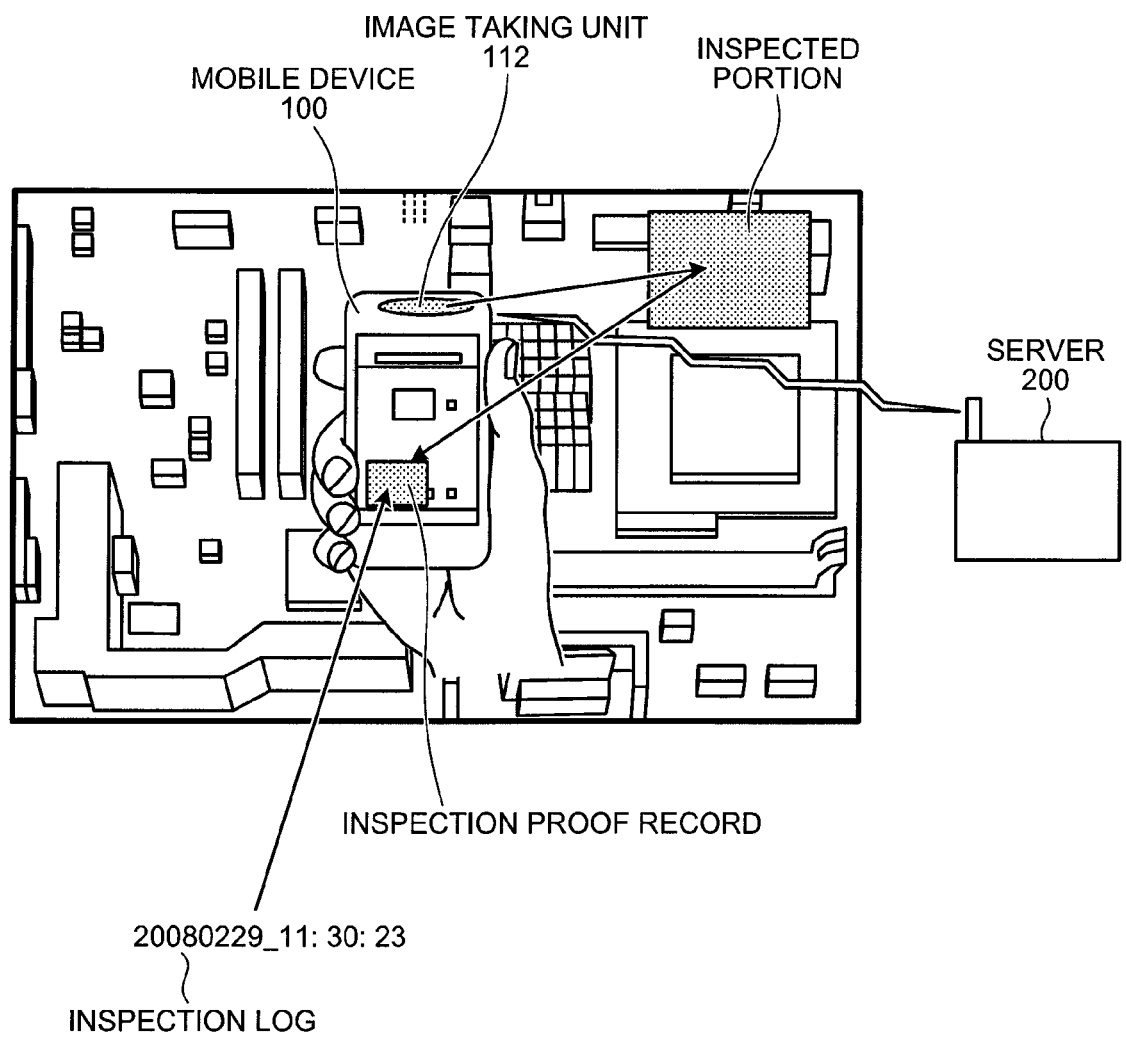
FIG. 13 is a conceptual diagram showing one example of a recording processing of a verification inspection according to the embodiment.

One example of an area-specific processing executing processing according to the embodiment will be explained in detail with reference to FIGS. 10 to 13. FIG. 10 is a flowchart showing one example of an area-specific processing executing processing according to the embodiment. FIGS. 11 and 12 are views showing one example of the projective transformation according to the embodiment. FIG. 13 is a conceptual diagram showing one example of a recording processing of a verification inspection according to the embodiment.

First, as shown in FIG. 10, the control unit 102 of the mobile device 100 controls the image taking unit 112 to thereby take an image of a position of the object to be inspected and pointed to by an inspector and a fingertip of the inspector pointing to the position (step SC-1). The control unit 102 of the mobile device 100 may perform projective transformation of the image of the inspected portion taken by the image taking unit 112 into an image taken from the front.

The projective transformation performed by the control unit 102 of the mobile device 100 is explained with reference to FIGS. 11 and 12.

The projective transformation performed by the control unit 102, for example, is executed by restoring the image photographed by the image taking unit 112 to an original state by using an inverse projective transformation. An example of the projective transformation is explained below. As shown in FIG. 11, when performing the projective transformation, a vanishing point of the image on an imaging plane 70 being an image plane photographed by the image taking unit 112 is obtained. For example, when an imaging plane shape 71 being an image shape on the imaging plane 70 is the rectangle as shown in FIG. 11, the two vanishing points S1 and S2 are obtained. The vanishing point is the point at which extended lines of two straight lines, which are formed parallel in an actual shape, cross to each other, when projecting a predetermined shape. By thus obtaining the vanishing point, an original size before the projection and the projective transformation parameters (a11 to a32) being the parameters when performing the projective transformation are obtained based on the vanishing point, and the projective transformation is performed using a following [Equation 1]. That is to say, the projective transformation is performed by obtaining a coordinate (u,v,1) after the projective transformation from a coordinate (x,y,1) before the projective transformation by the [Equation 1].

[Equation 1]

$$\begin{pmatrix} u \\ v \\ 1 \end{pmatrix} = \frac{1}{a31x + a32 + 1} \begin{pmatrix} a11 & a12 & a13 \\ a21 & a22 & a23 \\ a31 & a32 & 1 \end{pmatrix} \begin{pmatrix} x \\ y \\ 1 \end{pmatrix} \quad \text{(Equation 1)}$$

By thus performing the projective transformation on the coordinate of the imaging plane shape 71, which is the coordinate before the projective transformation, a projectively transformed shape 75, which is the shape after the projective transformation, may be obtained as shown in FIG. 12 by obtaining the coordinate after the projective transformation. The projectively transformed shape 75 is similar to an original shape 76, which is the shape when seeing the original imaged by the image taking unit 112 from the front direction, that is to say, the shape when seeing the imaged plane in the vertical direction. In place of the projective transformation, various conventional arts may be used.

Referring back to FIG. 10 again, the control unit 102 recognizes the position, on the object to be inspected, pointed to by the fingertip of the inspector (step SC-2).

Then, the control unit 102 compares a first image including at least part of the object to be inspected, obtained in advance by reading by the image reading unit such as the scanner by the user, and stored in the background information database 106b to a second image obtained by the image taking unit 112 by processing by the control unit 102 at step SC-1 and including at least part of the object to be inspected and the fingertip of the inspector to thereby retrieve the designated position on the object to be inspected (step SC-3).

If a simple identifying mark (e.g., a red circular sticker) is stuck on the fingertip of the inspector, the control unit 102 may compare the first image including at least part of the object to be inspected, obtained in advance by reading by the image reading unit such as the scanner by the user, and stored in the background information database 106b to the second image obtained by the image taking unit 112 by processing by the control unit 102 at step SC-1 and including at least part of the object to be inspected and the identifying mark to thereby retrieve the designated position on the object to be inspected based on the identifying mark.

If the background information database 106b stores the images such as the drawing of the object to be inspected, the control unit 102 picks out an inspection drawing of a predetermined area including the designated position from the drawings stored in the background information database 106b based on the designated position obtained by processing by the control unit 102 at step SC-3 to display the inspection drawing in the display area (step SC-4). In other words, the control unit 102 cuts out the drawing of the predetermined area including the designated position from the drawing and displays it in the display area based on the designated position obtained by the processing by the control unit 102 at step SC-3.

If the background information database 106b stores the designated position on the object to be inspected and the image such as the drawing of the predetermined area of the object to be inspected while associating them with each other, the control unit 102 may retrieve drawing information of the predetermined area corresponding to the designated position obtained by the processing by the control unit 102 at step SC-3 and display it in the display area. In other words, the control unit 102 may call up the drawing of the predetermined area corresponding to the designated position obtained by the processing by the control unit 102 at step SC-3 and stored in the background information database 106b and display it in the display area.

The icon displaying unit 102a displays the icon 1 in the display area to perform input of the inspection result (step SC-5).

The control unit 102 controls the displacement detecting unit 10 to thereby detect displacement of acceleration caused by movement of the mobile device 100 by the inspector (step SC-6).

The numerical condition determining unit 102g compares the displacement of the acceleration detected by the displacement detecting unit 10 to the numerical condition (e.g., a certain or lower acceleration in the horizontal direction of the mobile device 100) stored in the numerical condition-specific processing table 106c to thereby determine whether the displacement of the acceleration detected by the displacement detecting unit 10 satisfies the numerical condition (step SC-7).

When the numerical condition determining unit 102g determines that the displacement of the acceleration detected by the displacement detecting unit 10 does not satisfy the numerical condition (No at step SC-7), the icon moving unit 102b moves the icon 1 in the display area in synchronization with the displacement of the acceleration detected by the displacement detecting unit 10 (step SC-8).

The area determining unit 102c compares coordinates of the icon 1 moved and displayed in the display area to the specific area stored in the area-specific processing table 106a to thereby determine whether the icon 1 is in the specific area in the display area (step SC-9).

When the area determining unit 102*c* determines that the icon 1 is in the specific area in the display area (Yes at step SC-9), the area-specific processing executing unit 102*d* retrieves the area-specific processing stored in the area-specific processing table 106*a* and corresponding to the specific area (step SC-10).

Then, the area-specific processing executing unit 102*d* executes the input of the inspection result (e.g., pass or failure of the inspection), which is the retrieved area-specific processing, ends the processing, and returns to step SC-6 (step SC-11).

On the other hand, if the area determining unit 102*c* determines that the icon 1 is not in the specific area in the display area (No at step SC-9), the control unit 102 ends the processing and returns to step SC-6.

When the numerical condition determining unit 102*g* determines that the displacement of the acceleration detected by the displacement detecting unit 10 satisfies the numerical condition (Yes at step SC-7), the numerical condition-specific processing executing unit 102*h* retrieves the numerical condition-specific processing stored in the numerical condition-specific processing table 106*c* and corresponding to the numerical condition (step SC-12).

Then, in response to the inspection result input at step SC-12, the numerical condition-specific processing executing unit 102*h* executes recording processing of the inspection result (e.g., recording of the inspection result in the storage unit 106 of the mobile device 100), which is the retrieved numerical condition-specific processing (step SC-13), and ends the processing.

One example of a recording processing of a verification inspection performed by the control unit 102 will explained with reference to FIG. 13.

As shown in FIG. 13, if the inspector conducts recording of a result of a verification inspection, the control unit 102 of the mobile device 100 may control the image taking unit 112 of the mobile device 100 to thereby take an image of the inspected portion subjected to the verification inspection and add an inspection log (e.g., date and time of the image taking) to the image to form an inspection proof record. Then, the control unit 102 of the mobile device 100 may attach the inspection proof record to the inspection result to perform the recording processing of the inspection result.

As shown in FIG. 13, the control unit 102 of the mobile device 100 may send the inspection result and the like to the server 200 in the recording processing of the inspection result to record it in the storage unit 206 in the server 200. This is the end of the explanation of the structure of the recording processing of the verification inspection.

OTHER EMBODIMENTS

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the mobile device 100 are merely conceptual and may not necessarily physically resemble the structures shown in the drawings. For instance, the apparatus need not necessarily have the structure that is illustrated.

For example, the process functions performed by each device of the mobile device 100, especially the each process function performed by the control unit 102, can be entirely or partially realized by a central processing unit (CPU) and a computer program executed by the CPU or by a hardware using wired logic. The computer program, recorded on a recording medium to be described later, can be mechanically read by the mobile device 100 as the situation demands. In other words, the storage unit 106 such as read-only memory (ROM) or hard disk (HD) stores the computer program that can work in coordination with the operating system (OS) to issue commands to the CPU and cause the CPU to perform various processes. The computer program is first loaded to the random access memory (RAM), and forms a control unit in collaboration with the CPU.

Alternatively, the computer program can be stored in any application program server connected to the mobile device 100 via the network, and can be fully or partially loaded as the situation demands.

The computer-readable recording medium on which the computer program can be stored may be a portable type such as flexible disk, magneto optic (MO) disk, ROM, erasable programmable ROM (EPROM), electrically erasable programmable ROM (EEPROM), compact disk-read-only memory (CD-ROM), digital versatile disk (DVD), or a communication medium that stores the computer program for a short term such as communication channels or carrier waves that transmit the computer program over networks such as local area network (LAN), wide area network (WAN), and the Internet.

Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

The storage unit 106, 206 are fixed disk devices such as RAM, ROM, and hard disk or flexible disk, optical disk, and store therein various programs, tables, databases (such as the area-specific processing table 106*a*, the background information database 106*b*, and the numerical condition-specific processing table 106*c*), and files required for various processes.

The distribution and integration of the device are not limited to those illustrated in the figures. The device as a whole or in parts can be functionally or physically distributed or integrated in an arbitrary unit according to various attachments or how the device is to be used.

According to the present invention, when the user moves the mobile device 100, the icon 1 displayed in the display area is moved into the specific area in synchronization with the movement, and, as a result, the area-specific processing can be executed. In other words, the invention can visualize the displacement of the physical value, which is detected as a result of moving (e.g. shaking) of the mobile device 100 by the user, by using the icon 1 displayed in the display unit 114. The displacement is detected in the displacement detecting unit 10 such as an acceleration sensor, a gyroscope, or a magnetic sensor. In this way, the invention easily helps the user visually grasp small movements of the mobile device 100 by the user by using the icon 1, which reduces factors responsible for erroneous operation in the area-specific processing executed in synchronization with the movement of the icon 1 into the specific area.

The invention makes it possible to visualize movements of the mobile device 100 along three axes. As compared with devices using other sensors such as a uniaxial acceleration sensor, the invention makes it possible to improve usability in such a manner as to increase variations in pieces of input processing to the mobile device 100 to be executed based on the displacement of the physical value.

The invention makes it possible to easily, reliably, and visually grasp the movement of the icon 1 into the specific area in the display area, which improves efficiency of the input operation.

According to the present invention, the color or the shape (e.g., size or the shape) of the icon 1 displayed on a screen can be changed when the icon 1 is moved into the specific area in the display area, which further improves viewability. As a result, even in an outdoor inspection in which a screen is less viewable, for example, the invention helps recognize icon 1 indication and enhances working efficiency.

The invention makes it possible to check the background image (e.g., an image such as a drawing for the inspection and a check sheet) and operate the icon 1 simultaneously, which enhances the working efficiency.

The invention makes it possible to check the icon 1 and a background display at the same time, which improves the working efficiency. In other words, if the icon 1 is not translucent, it is necessary to move the icon 1 to another position to check a part of the background image on which the icon 1 is placed, which may cause the erroneous operation (e.g., the icon 1 may be moved into an unintended specific area and area-specific processing may be executed). The invention does not require unnecessary moving operations and reduces erroneous operations by improving viewability of the background image by displaying the icon 1 in the translucent color.

The invention makes it possible to dispose the obstacle 2 between the specific areas in the display area. By displaying the obstacle 2 as a partition between the specific areas, for example, the invention helps visually grasp a boundary between the specific areas. When the obstacle 2 is displayed as the partition between the specific areas, the invention requires the user to move the icon 1 to get around the specific obstacle in moving the icon 1 into a different area. Therefore, the invention makes it possible to prevent the icon 1 from moving into an unintended specific area, which increases reliability of the operation.

The invention makes it possible to smoothly control the movement of the icon 1. Because the icon 1 is in the circular or spherical shape in the invention, a distance from a center of gravity to an outer periphery of the icon 1 becomes constant. In this way, movement of the icon 1 in the display area is less likely to be changed and restricted by orientation of the icon 1. For example, with the invention, the icon 1 is constant in behavior irrespective of its orientation when the icon 1 collides with the same portion of the obstacle 2 from the same direction.

The invention makes it possible to execute the numerical condition-specific processing based on the movement satisfying the specific numerical condition and different from the area-specific processing based on the movement of the icon 1 into the specific area. As a result, the invention makes it possible to synchronously perform another piece of processing (numerical condition-specific processing) such as change of the background image, recording of the inspection result, and a retry when the user shakes the mobile device 100 strongly or lightly in a vertical direction, a horizontal direction, or a front-rear direction and the movement of the mobile device 100 is detected, the movement causing the displacement of the physical value satisfying the predetermined numerical condition (e.g., a threshold value, a range of numerical value, and a specific value).

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile device comprising:
   a control unit;
   a storage unit;
   a display unit; and
   a displacement detecting unit for detecting displacement of a physical value caused when the mobile device moves, wherein
   the storage unit includes:
      an area storage unit for storing (i) a specific area in a display area displayed in the display unit and (ii) an area-specific processing associated with the specific area and to be executed when an icon is in the specific area, and
   the control unit includes:
      an icon displaying unit for displaying the icon in the display area of the display unit;
      an icon moving unit for moving the icon displayed by the icon displaying unit, in the display area and based on the displacement of the physical value detected by the displacement detecting unit;
      an area determining unit for comparing coordinates of the icon moved by the icon moving unit and displayed in the display area to the specific area stored in the area storage unit to thereby determine whether the icon is in the specific area; and
      an area-specific processing executing unit for retrieving the area-specific processing corresponding to the specific area and stored in the area storage unit and for executing the area-specific processing when the area determining unit determines that the icon is in the specific area.

2. The mobile device according to claim 1, wherein the displacement detecting unit is a triaxial acceleration sensor and the physical value includes gravity acceleration or acceleration.

3. The mobile device according to claim 1, wherein the control unit further includes:
   an icon display format changing unit for changing a display format of the icon when the area determining unit determines that the icon is in the specific area.

4. The mobile device according to claim 3, wherein the display format includes a color or a shape of the icon.

5. The mobile device according to claim 1, wherein
the icon displaying unit is configured to display a background image in the display area and to superimpose the icon on the background image.

6. The mobile device according to claim 1, wherein
the icon displaying unit is configured to display the icon in a translucent color.

7. The mobile device according to claim 1, wherein
the control unit further includes:
an obstacle displaying unit for displaying an obstacle in the display area of the display unit, and
the icon moving unit is configured to perform image display control so that the icon is incapable of moving through the obstacle displayed by the obstacle displaying unit in moving the icon displayed by the icon displaying unit, in the display area and based on displacement of the physical value detected by the displacement detecting unit.

8. The mobile device according to claim 1, wherein
the icon displaying unit is configured to display the icon in a circular or spherical shape.

9. The mobile device according to claim 1, wherein
the storage unit further includes:
a numerical condition storage unit for storing (i) a numerical condition of the displacement of the physical value and (ii) a numerical condition-specific processing associated with the numerical condition and to be executed when the displacement detecting unit detects the displacement of the physical value satisfying the numerical condition, and
the control unit further includes:
a numerical condition determining unit for comparing the displacement of the physical value detected by the displacement detecting unit to the numerical condition stored in the numerical condition storage unit to thereby determine whether the displacement of the physical value satisfies the numerical condition; and
a numerical condition-specific processing executing unit for retrieving the numerical condition-specific processing stored in the numerical condition storage unit and corresponding to the numerical condition and executing the numerical condition-specific processing when the numerical condition determining unit determines that the displacement satisfies the numerical condition.

10. An area-specific processing executing method executed by a mobile device including: a control unit; a storage unit; a display unit; and a displacement detecting unit that detects displacement of a physical value caused when the mobile device moves, wherein
the storage unit includes:
an area storage unit that stores (i) a specific area in a display area displayed in the display unit and (ii) an area-specific processing associated with the specific area and to be executed when an icon is in the specific area, and
the method comprises the following steps executed by the control unit:
an icon displaying step of displaying the icon in the display area of the display unit;
an icon moving step of moving, in the display area based on the displacement of the physical value detected by the displacement detecting unit, the icon displayed at the icon displaying step;
an area determining step of comparing coordinates of the icon moved at the icon moving step and displayed in the display area to the specific area stored in the area storage unit to thereby determine whether the icon is in the specific area; and
an area-specific processing executing step of retrieving the area-specific processing corresponding to the specific area and stored in the area storage unit and executing the area-specific processing when it is determined at the area determining step that the icon is in the specific area.

11. The area-specific processing executing method according to claim 10, wherein
the displacement detecting unit is a triaxial acceleration sensor and the physical value includes gravity acceleration or acceleration.

12. The area-specific processing executing method according to claim 10, further comprising the following step executed by the control unit:
an icon display format changing step of changing a display format of the icon when it is determined at the area determining step that the icon is in the specific area.

13. The area-specific processing executing method according to claim 12, wherein
the display format includes a color or a shape of the icon.

14. The area-specific processing executing method according to claim 10, wherein
the icon displaying step includes displaying a background image in the display area and superimposing the icon on the background image.

15. The area-specific processing executing method according to claim 10, wherein
the icon displaying step includes displaying the icon in a translucent color.

16. The area-specific processing executing method according to claim 10, further comprising the following step executed by the control unit:
an obstacle displaying step of displaying an obstacle in the display area of the display unit, wherein
the icon moving step includes performing image display control so that the icon is incapable of moving through the obstacle displayed at the obstacle displaying step in moving, in the display area based on displacement of the physical value detected by the displacement detecting unit, the icon displayed at the icon displaying step.

17. The area-specific processing executing method according to claim 10, wherein
the icon displaying step includes displaying the icon in a circular or spherical shape.

18. The area-specific processing executing method according to claim 10, wherein
the storage unit further includes:
a numerical condition storage unit that stores (i) a numerical condition of the displacement of the physical value and (ii) a numerical condition-specific processing associated with the numerical condition and to be executed when the displacement detecting unit detects the displacement of the physical value satisfying the numerical condition, and
the method further comprises the following steps executed by the control unit:
a numerical condition determining step of comparing the displacement of the physical value detected by the displacement detecting unit to the numerical condition stored in the numerical condition storage unit to thereby determine whether the displacement of the physical value satisfies the numerical condition; and
a numerical condition-specific processing executing step of retrieving the numerical condition-specific processing stored in the numerical condition storage unit and corresponding to the numerical condition and executing the numerical condition-specific processing when it is determined at the numerical condition determining step that the displacement satisfies the numerical condition.

19. The area-specific processing executing method according to claim 10, wherein the area storage unit stores
- a plurality of different specific areas in the display area displayed in the display unit, and
- a plurality of different area-specific processings each associated with one of the specific areas and executed by the control unit when the icon is in the associated specific area.

20. The area-specific processing executing method according to claim 16, wherein
- the area storage unit stores different first and second specific areas in the display area displayed in the display unit,
- the obstacle displaying step includes displaying the obstacle between the first and second specific areas in the display area of the display unit, and
- the icon moving step includes performing image display control so that the icon is prevented from moving between the first and second specific areas unless a specific movement or a series of specific movements of the mobile device is performed.

* * * * *